United States Patent [19]

Mitsuno et al.

[11] Patent Number: 4,902,738

[45] Date of Patent: Feb. 20, 1990

[54] THERMOPLASTIC ELASTOMER COMPOSITION AND PROCESS FOR PRODUCING SAME

[75] Inventors: Tatsuyuki Mitsuno; Hideo Shinonaga; Akio Daimon; Satoru Hosoda, all of Chiba, Japan

[73] Assignee: Sumitomo Chemical Company Limited, Osaka, Japan

[21] Appl. No.: 277,864

[22] Filed: Nov. 30, 1988

Related U.S. Application Data

[63] Continuation of Ser. No. 111,878, Oct. 23, 1987, abandoned.

[30] Foreign Application Priority Data

Oct. 28, 1986 [JP] Japan ................................. 61-257635

[51] Int. Cl.$^4$ ..................... C08F 255/00; C08K 5/01; C08L 23/10
[52] U.S. Cl. .................................. 524/525; 524/518; 524/528; 524/530; 525/193; 525/194
[58] Field of Search ............... 524/518, 525, 528, 530; 525/193, 194

[56] References Cited

U.S. PATENT DOCUMENTS

3,641,215  2/1972  Osamoto et al. ..................... 525/193
4,247,652  1/1981  Matsuda ............................. 525/211

FOREIGN PATENT DOCUMENTS

0142930  5/1985  European Pat. Off. .
1907926  8/1970  Fed. Rep. of Germany .
034837  3/1983  Japan ................................. 525/193

OTHER PUBLICATIONS

European Search Report for EP 87 30 9515.
Chemical Abstracts, vol. 99, No. 14, Oct. 3, 1983, p. 65, Abstract No. 106639z.

Primary Examiner—John C. Bleutge
Assistant Examiner—David Buttner
Attorney, Agent, or Firm—Cushman, Darby & Cushman

[57] ABSTRACT

A thermoplastic elastomer composition which is excellent in melt-flowability and is able to afford injection molded articles superior in appearance is provided, which is a mixture comprising (A) 20–50 parts by weight of an olefinic copolymer rubber, (B) 50–80 parts by weight of an olefinic plastic having a ratio of melt index $M_1/M_0$ of 2–50 wherein $M_0$ is a melt index of the plastic before subjected to thermal decomposition with organic peroxide and $M_1$ is a melt index of the plastic after subjected to the thermal decomposition with the organic peroxide, sum of (A) and (B) being 100 parts by weight, (C) 5–25 parts by weight of a mineral oil and (D) 0.1–3 parts by weight of a bismaleimide compound, said mixture being dynamically heat treated with (E) an organic peroxide after bismaleimide compound (D) is homogeneously dispersed in the mixture.

14 Claims, No Drawings

4,902,738

THERMOPLASTIC ELASTOMER COMPOSITION AND PROCESS FOR PRODUCING SAME

RELATED APPLICATIONS

This application is a continuation of U.S. application Ser. No. 07/111,878 filed Oct. 23, 1987, now abaonded.

FIELD OF THE INVENTION

This invention relates to a thermoplastic elastomer composition and a process for producing it.

BACKGROUND OF THE INVENTION

Recently, uses of thermoplastic elastomer composition are being steadily increased including parts of automobiles, household appliances, etc. because of their low hardness and flexible properties and their moldability by the methods such as extrusion molding, injection molding, etc. like the conventional thermoplastic resins.

Especially, olefinic thermoplastic elastomers are superior in flexibility, heat resistance and low temperature impact resistance and hence are in increased demand as exterior trim parts due to the trend of lightening of automobiles, elaboration in design of automobiles and industrial rationalization.

Typical example thereof is bumper part, which is a large functional part and is required to have superior injection moldability, heat resistance, mechanical properties such as low temperature impact resistance, etc., superior appearance of molded products and superior paintability.

This invention relates to a thermoplastic elastomer composition capable of providing large molded products good in injection moldability and excellent in appearance with keeping low temperature impact resistance and a process for producing such composition. This composition is especially intended to use as the automobile parts as mentioned above.

Hitherto, compositions comprising olefinic copolymer rubbers and olefinic plastics have been generally used as olefinic thermoplastic elastomers. However, in order to effectively exhibit the characteristics such as heat resistance and low temperature impact resistance, partial crosslinking of olefinic copolymer rubbers with organic peroxides or the like has been generally carried out.

Under the ordinary temperature and/or pressure conditions for injection molding of thermoplastic elastomers, viscosity of olefinic copolymer rubber used as a component of the elastomer is high and besides, partial crosslinking thereof with organic peroxide causes further decrease of melt-flowability of the thermoplastic elastomer. Therefore, when the thermoplastic elastomer is injection molded, if the article to be produced is of large size and of thin-wall, molten thermoplastic elastomer in mold changes greatly in its melt-flowability and is difficult to fill uniformly into small parts of the mold or undesirable phenomena such as flow marks or weld lines occur on the surface of molded articles, which considerably damage commercial value of the articles.

Especially, for exterior trim parts of large size represented by bumper parts, high melt flowability at injection molding and excellent appearance of molded articles are essential together with flexibility, heat resistance, low temperature impact resistance and paintability and thermoplastic elastomers having all of these properties have been demanded.

Various improvements have been proposed in an attempt to attain these objects.

For example, Japanese Pat. Publication (Kokoku) No. 15741/81 discloses that injection molded products of large size and of thick-wall having surface appearance with less sink marks and flow marks can be obtained with addition of peroxide non-crosslinking type hydrocarbon rubber materials and/or mineral oil type softening agents.

Furthermore, Japanese Pat. Publication (Laid-open) (Kokai) No. 34837/83 proposes a method for improving degree of flow marks formed on the surface of injection molded articles by heat treating a composition comprising a specific olefinic copolymer rubber and a specific olefinic plastic in the presence of an organic peroxide and a bismaleimide compound and then homogeneously blending a specific olefinic plastic with said composition.

However, these methods cannot still provide tensile strength and tesile elongation sufficient to develop low temperature impact resistance and furthermore, there often occurs difference in surface gloss between the end position and the position near the gate in an injection molded article of large size and besides, considerable flow marks often occur. Thus, satisfactory results have not yet been obtained.

SUMMARY OF THE INVENTION

The object of this invention is to provide a thermoplastic elastomer composition which affords injection molded products free from the above defects and superior in melt-flowability and appearance and a process for preparing the same.

DESCRIPTION OF THE INVENTION

As a result of the inventors' intensive researches, it has been found that a thermoplastic elastomer composition which affords injection molded products which have good melt-flowability and are superior in appearance can be obtained by preparing a mixture comprising an olefinic copolymer rubber, an olefinic plastic thermally decomposed to a specific degree with an organic peroxide, a mineral oil and a bismaleimide compound in which the bismaleimide compound is homogeneously dispersed and then subjecting the thus obtained mixture to a dynamic heat treatment in the presence of an organic peroxide.

That is, this invention relates to a thermoplastic elastomer composition which is prepared by dynamic heat treatment, in the presence of an organic peroxide (E), of a mixture comprising (A) 20–50 parts by weight of an olefinic copolymer rubber, (B) 50–80 parts by weight of an olefinic plastic having a ratio ($M_1/M_0$) of melt index (JIS K7210, 230° C.) of 2–50 wherein $M_0$ is a melt index before thermal decomposition with an organic peroxide and $M_1$ is a melt index after the thermal decomposition with proviso that sum of (A) and (B) is 100 parts by weight, (C) 5–25 parts by weight of a mineral oil and (D) 0.1–3 parts by weight of a bismaleimide compound.

This invention further relates to a process for producing a thermoplastic elastomer composition which comprises preparing a mixture of (A) 20–50 parts by weight of an olefinic copolymer rubber, (B) 50–80 parts by weight of an olefinic plastic having a ratio ($M_1/M_0$) of melt index (JIS K7210, 230° C.) of 2–50 wherein $M_0$ is a melt index before thermal decomposition with an organic oxide and $M_1$ is a melt index after the thermal decomposition, with the proviso that sum of (A) and (B) is 100 parts by weight, (C) 5–25 parts by weight of a mineral oil and (D) 0.1–3 parts by weight of a bismaleimide compound in which said maleimide compound (D) is homogeneously dispersed and then subjecting the mixture to a dynamic heat treatment in the presence of an organic peroxide (E).

Now, it has been found that when an olefinic plastic which has been properly thermally decomposed with an organic peroxide is used, high melt-flowability is obtained in a wide injection molding area, flow marks which often occur on the surface of injection molded products do not occur and good appearance is obtained, though the reason therefor has not yet been elucidated.

Furthermore, it appears that when a specific amount of a bismaleimide compound is homogeneously dispersed in a composition comprising an olefinic copolymer rubber, an olefinic plastic and a mineral oil and then this mixture is dynamically heat treated in the presence of an organic peroxide, partial crosslinking occurs more homogeneously, resulting in uniform surface of injection molded products and improvement of unfavorable phenomena such as flow mark, etc.

This invention will be specifically explained below.

(A) Olefinic copolymer rubber

The olefinic copolymer rubber used in this invention is a rubber which is an amorphous random elastic copolymer mainly composed of olefin and is partially crosslinked and decreased in melt-flowability by mixing with organic peroxide and dynamically heat treating it, such as ethylene-propylene copolymer rubber, ethylene-propylene-non-conjugated diene copolymer rubber, ethylene-butadiene copolymer rubber, etc. Of these rubbers, preferred are ethylenepropylene copolymer rubber and ethylene-propylene-non-conjugated diene copolymer rubber (where the nonconjugated diene includes, for example, dicyclopentadiene, 1,4-hexadiene, cyclooctadiene, methylene-norbornene, ethylidenenotbornene, etc.) and especially preferred are ethylene-propylene-non-conjugated diene copolymer rubbers.

Mooney viscosity ($ML_{1+4}100°$ C.) of the copolymer rubbers is preferably 30–140. When Mooney viscosity is less than 30, compositions obtained are inferior in tensile characteristics necessary to develop low temperature impact resistance and when more than 140, tensile strength is low and gel-like cakes called fish-eyes are recognized on the surface of injection molded products.

Ethylene-propylene copolymer rubbers and ethylene-propylene-non-conjugated diene copolymer rubbers preferably have a propylene content of 10–30% by weight. When propylene content is less than 10% by weight, the copolymer rubbers have crystallinity due to increase in ethylene component, resulting in decrease of heat resistance. When more than 30% by weight, decomposition reaction with organic peroxide proceeds too much and this is not desired.

Iodine value (degree of unsaturation) of said copolymer rubber is preferably 16 or less and within this range of the iodine value, partially crosslinked composition can be obtained which has melt-flowability and rubber properties balanced with each other.

(B) Olefinic plastics

Olefinic plastics used in this invention mean those which are decreased in molecular weight and increased in melt-flowability when mixed with organic peroxide and dynamically heat treated and include, for example, isotactic polypropylenes and copolymers of propylene with a small amount of other α-olefins such as propylene-ethylene copolymer, propylene-1-butene copolymer, propylene-1-hexene copolymer, propylene-4-methyl-1-pentene copolymer, etc. These olefinic plastics are used after being properly thermally decomposed with organic peroxides typically such as 1,3-bis(-tert-butylperoxyisopropyl)benzene. That is, olefinic plastics having a melt index ($M_0$) (measured according to JIS K7210 at 230° C.) before thermal decomposition of 1–10 g/10 min, preferably 2–6 g/10 min are thermally decomposed with organic peroxides to give a melt index ($M_1$) of 20–50 g/10 min, preferably 30–40 g/10 min and then they are used.

That is, the melt index ratio ($M_1/M_0$) before and after the thermal decomposition is 2–50. When degree of thermal decomposition ($M_1/M_0$) with organic peroxide is less than 2, melt-flowability of composition is inferior or unfavorable phenomena such as flow marks occur on the surface of injection molded products. On the other hand, when the thermal decomposition degree ($M_1/M_0$) is more than 50, tensile characteristics necessary to develop low temperature impact resistance is poor. It is preferably 3–40, more preferably 5–20.

(C) Mineral Oil

The mineral oil used in this invention are petroleum fractions of high boiling points and can be classified to paraffinic, naphthenic and aromatic types. They are used not only for easy processing in dynamic heat treatment of the mixture of olefinic copolymer rubber, olefinic plastic, etc. or for acceleration of dispersion of carbon black, but also for improvement of melt-flowability of the resulting thermoplastic elastomer composition or reduction of hardness to increase flexibility and elasticity.

(D) Bismaleimide compounds

The bismaleimide compounds used in this invention include, for example, N,N'-m-phenylenebismaleimide, toluylenebismaleimide, etc. As N,N'-m-phenylenebismaleimide, there may be used, for example, commercially available HVA-2 (DuPont de Nemours, E. I., Co.), SOKSINOL BM (Sumitomo Chemical Co. Ltd.), etc.

(E) Organic peroxides

As examples of the organic peroxides used in this invention, mention may be made of 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy)-3,5,5-trimethylcyclohexane, 2,5-dimethyl-2,5-di(peroxybenzoyl)hexyne-3, dicumyl peroxide, etc. These may be used alone or in combination.

(F) Compositional ratio

Proportion of olefinic copolymer rubber (A) in 100 parts by weight of mixture of olefinic copolymer rubber (A) and olefinic plastic (B) is 20–50 parts by weight. When less than 20 parts by weight, crosslinking reaction with organic peroxide is insufficient and further the thermoplastic elastomer composition lacks necessary flexibility and low hardness. When more than 50 parts by weight, appearance of injection molded products important as exterior trim parts of automobiles is damaged or the composition is inferior in heat resistance.

Proportion of mineral oil (C) is 5–25 parts by weight for 100 parts by weight of mixture comprising olefinic copolymer rubber (A) and olefinic plastic (B). When less than 5 parts by weight, melt-flowability of thermoplastic elastomer composition is insufficient and when more than 25 parts by weight, heat resistance important for the intended uses is markedly damaged.

Proportion of bismaleimide compound (D) is 0.1–3 parts by weight for 100 parts by weight of mixture comprising olefinic copolymer rubber (A) and olefinic plastic (B). When less than 0.1 part by weight, the more uniform partial crosslinking which is characteristic of this invention is difficult to occur and decomposition of olefinic plastic with organic peroxide is accelerated. When more than 3 parts by weight, melt-flowability of thermoplastic elastomer composition decreases to result in inferior surface appearance of injection molded products.

Amount of organic peroxide (E) used in this invention may be 0.03–0.5 part by weight for 100 parts by weight of mixture of olefinic copolymer rubber (A) and olefinic plastic (B).

As described above, it is essential for this invention to use olefinic copolymer rubber (A), olefinic plastic (B), mineral oil (C), bismaleimide compound (D) and organic peroxide (E) at a specific ratio.

(G) Process for production of the composition and method of molding

According to the process of this invention, first olefinic copolymer rubber (A), olefinic plastic (B), mineral oil (C) and bismaleimide compound (D) are mixed, melted and kneaded. This can be performed by melt kneading of them by known kneading machines such as mixing roll, Banbury mixer, extruder, kneader and continuous mixer at 170°–280° C.

In the process of this invention, it is an important technical requirement that bismaleimide compound (D) is uniformly dispersed in said mixture. This is desirably carried out in an inert gas such as nitrogen, carbon dioxide or the like.

Subsequently, the mixture is dynamically heat treated in the presence of organic peroxide (E) and this can be performed by using known kneading machines as mentioned above.

If necessary, the thermoplastic elastomer composition of this invention may further contain various additives or modifying components such as fillers, e.g., carbon black, lubricants, pigments, stabilizers, ultraviolet ray absorbers, etc.

(H) Characteristics and uses of the composition

The thermoplastic elastomer composition of this invention has good low temperature impact resistance and high melt-flowability and affords injection molded products superior in appearance.

That is, the composition is improved in tensile strength and elongation which develop low temperature impact resistance and injection molded products of large size made therefrom have small difference in surface gloss between the gate portion and the another end portion and besides are less in flow marks and weld lines.

Since the thermoplastic elastomer composition of this invention has the excellent effects as mentioned above, it can be utilized in the fields of the following representative uses:

(1) Bumper parts such as bumper, bumper corner, bumper air dam skirt, etc.

(2) Automobile exterior trim parts having decorative function such as side mole, steering wheel, splash board, etc.

(3) Electric parts such as connector, cap plug, etc.

The following nonlimiting examples and comparative examples illustrate this invention.

Determination of appearance of compositions and property tests in the examples are in accordance with the following methods.

(1) Method of preparation of test specimen

The resulting elastomer composition is injection molded (NEOMATT injection molding machine manufactured by Sumitomo Heavy Industries, Ltd.) at 200° C. to make a flat sheet of 100 mm width, 400 mm length and 3 mm thickness which is subjected to various tests.

(2) Melt index

This is measured according to JIS-K7210 at 230° C. under a load of 2.16 kg.

(3) Appearance (Degrees of flow mark and occurrence of fish eye)

Degree of flow mark and degree of occurrence of fish eye on the surface of said flat sheet are graded into five steps 1–5 by visual evaluation as follows:

Flow mark

5: no mark observed
4: 2–3 marks observed near a gate
3: marks observed from a gate to the center
2: marks observed as broad as ¾ of the surface
1: marks observed over the whole of the surface Fish eye 5: no eye observed
4: gels (less than 1 mm) observed
3: gels (1–3 mm) observed
2: gels (3–5 mm) observed
1: gels (greater than 5 mm) observed (4) Flexural modulus This is measured according to JIS-K7203 at a span of 50 mm and a bending rate of 1 mm/mm.

(5) Tensile strength, elongation

This is measured according to JIS-K6760 using a JIS No. 2 dumbbell specimen at a pulling rate of 50 mm/mm.

(6) Heat resistance

This is determined by cantilever beam method wherein sagging amount after 1 hour at 120° C. with a specimen of 20 mm width, 100 mm length and 3 mm thickness is measured.

EXAMPLE 1

40 parts by weight of ethylene-propylene-ethylidenenorbornene copolymer rubber (referred to as "EPDM-1" hereinafter) having a Mooney viscosity (100° C.) of 70 and a propylene content of 25% by weight and an ethylidenenorbornene content of 5% by weight, 60 parts by weight of polypropylene (referred to as "PP-1" hereinafter) having a melt index ($M_0$) of 4 before thermal decomposition and a melt index ($M_1$) of 30 after thermal decomposition ($M_1/M_0=7.5$ (said melt index was measured according to JIS-K7210 at 230° C.) and 0.4 part by weight of N,N'-m-phenylenebismaleimide (referred to as "BM" hereinafter) were melt kneaded by a Banbury mixer in a nitrogen atmosphere at 180° C. for 5 minutes. Thereafter, thereto was added 15 parts by weight of a naphthenic process oil (referred to as "oil" hereinafter) and kneading was continued for 5 minutes and then the kneaded product was passed through rolls and pelletized by a sheet cutter.

Then, the resulting pellets (referred to as "CP-1" hereinafter) were mixed with 0.07 part of 1,3-bis(t-butylperoxyisopropyl)benzene (referred to as "PO-1") by a tumbling mixer and the mixture was extruded by a 65 mm extruder in a nitrogen atmosphere at 240° C. to obtain pellets of the objective composition.

Test results are shown in Table 1.

EXAMPLE 2

Example 1 was repeated except that ethylene-propylene-ethylidenenorbornene copolymer rubber (EPDM-2) having a Mooney viscosity (100° C.) of 110 and a propylene content of 25% by weight and an ethylidenenorbornene content of 5% by weight was used in place of EPDM-1.

EXAMPLE 3

Example 1 was repeated except that EPDM-1 was used in an amount of 30 parts by weight and PP-1 was used in an amount of 70 parts by weight.

EXAMPLE 4

Example 1 was repeated except that polypropylene (PP-2) having a melt index of 2 before thermal decomposition and that of 40 after thermal decomposition ($M_1/M_0=20$) was used in place of PP-1.

EXAMPLE 5

Example 1 was repeated except that ethylenepropylene block copolymer (PP-3) having 6.8% of ethylene and a melt index of 3 before thermal decomposition and that of 30 after thermal decomposition ($M_1/M_0=10$) was used in place of PP-1.

EXAMPLE 6

Example 1 was repeated except that oil was used in an amount of 20 parts by weight.

EXAMPLE 7

Example 1 was repeated except that BM was used in an amount of 1.5 part by weight.

COMPARATIVE EXAMPLES 1 and 2

Example 1 was repeated except that ethylenepropylene-ethylidenenorbornene copolymer rubber (EPDM-3 or EPDM-4) having a Mooney viscosity (100° C.) of 20 (Comparative Example 1) or 170 (Comparative example 2) and having a propylene content of 25% by weight and an ethylidenenorbornene content of 5% by weight was used in place of EPDM-1.

COMPARATIVE EXAMPLES 3 and 4

Example 1 was repeated except that EPDM-1 was used in an amount of 15 parts by weight (Comparative Example 3) or 60 parts by weight (Comparative Example 4).

COMPARATIVE EXAMPLES 5 and 6

Example 1 was repeated except that polypropylene (PP-4) having a melt index of 4 before thermal decomposition and that of 7 after thermal decomposition ($M_1/M_0=1.75$) (Comparative Example 5) or polypropylene (PP-5) having a melt index of 2 before thermal decomposition and that of 120 after thermal decomposition, respectively ($M_1/M_0=60$) (Comparative Example 6) was used in place of PP-1.

COMPARATIVE EXAMPLES 7 and 8

Example 1 was repeated except that oil was used in an amount of 3 parts by weight (Comparative Example 7) or 35 parts by weight (Comparative Example 8) was used.

COMPARATIVE EXAMPLES 9 and 10

Example 1 was repeated except that BM was used in an amount of 0.05 part by weight (Comparative Example 9) or 4 part by weight (Comparative Example 10).

COMPARATIVE EXAMPLE 11

Example 1 was repeated except that pellets CP-2 which corresponded to CP-1 from which BM was omitted was used and this CP-2 was mixed with 0.007 part by weight of PO-1 and 0.4 part by weight of BM.

The results obtained in the above examples and comparative examples are shown in Table 1.

As described above, this invention provides a thermoplastic elastomer composition which is superior in melt-flowability and affords injection molded products excellent in appearance and a process for producing the composition.

TABLE 1

| | No. | Melt index (g/10 min.) | Appearance | | Flexural modulus (Kg/cm$^2$) | Tensile tests | | Heat sag (mm) |
| | | | degree of flow mark | degree of occurence of fish eye | | Tensile strength (Kg/cm$^2$) | Elongation (%) | |
|---|---|---|---|---|---|---|---|---|
| Examples | 1 | 18 | 4 | 5 | 4500 | 181 | 610 | 4 |
| | 2 | 24 | 4 | 4 | 4700 | 213 | 670 | 4 |
| | 3 | 28 | 4 | 5 | 4700 | 185 | 580 | 4 |
| Comparative Examples | 1 | 10 | 2 | 5 | 4500 | 132 | 540 | 3 |
| | 2 | 35 | 5 | 1 | 4500 | 110 | 230 | 4 |
| | 3 | 42 | 5 | 4 | 7800 | 73 | 90 | 2 |
| | 4 | 5 | 2 | 5 | 2500 | 125 | 430 | 15 |
| Examples | 4 | 22 | 4 | 5 | 4700 | 196 | 610 | 4 |
| | 5 | 14 | 3–4 | 5 | 3800 | 168 | 540 | 7 |
| Comparaitve Examples | 5 | 11 | 2 | 5 | 4500 | 145 | 480 | 4 |
| | 6 | 45 | 4 | 3 | 4800 | 58 | 70 | 3 |
| Examples | 6 | 33 | 4 | 5 | 4100 | 165 | 570 | 7 |
| | 7 | 15 | 4 | 5 | 4600 | 225 | 680 | 4 |

TABLE 1-continued

|  | No. | Melt index (g/10 min.) | Appearance | | Flexural modulus (Kg/cm$^2$) | Tensile tests | | Heat sag (mm) |
|---|---|---|---|---|---|---|---|---|
|  |  |  | degree of flow mark | degree of occurence of fish eye |  | Tensile strength (Kg/cm$^2$) | Elongation (%) |  |
|  | 7 | 8 | 2 | 4 | 6000 | 210 | 640 | 3 |
| Comparative | 8 | 35 | 5 | 4 | 2800 | 125 | 470 | 12 |
|  | 9 | 15 | 3 | 5 | 4300 | 145 | 560 | 5 |
| Examples | 10 | 8 | 2 | 1 | 4500 | 197 | 610 | 4 |
|  | 11 | 8 | 2 | 4 | 4200 | 143 | 540 | 6 |

We claim:

1. A thermoplastic elastomer composition which comprises a mixture comprising (A) 20–50 parts by weight of an olefinic copolymer rubber, (B) 50–80 parts by weight of a thermally pre-decomposed olefinic plastic having a ratio of melt index $M_1/M_0$ of 2–50 wherein $M_1/M_0$ is a thermal decomposition degree of olefinic plastic thermally pre-decomposed, $M_0$ is a melt index of the plastic before being subjected to thermal decomposition with organic peroxide and $M_1$ is a melt index of the plastic after being subjected to the thermal decomposition with the organic peroxide, sum of (A) and (B) being 100 parts by weight, (C) 5–25 parts by weight of a mineral oil, (D) 0.1–3 parts by weight of a bismaleimide compound, and (E) an organic peroxide.

2. A composition according to claim 1 wherein the olefinic copolymer rubber (A) has a Mooney viscosity ($ML_{1+4}100°$ C.) of 30–140.

3. A composition according to claim 1 wherein the olefinic copolymer rubber (A) is an ethylene-propylene-non-conjugated diene copolymer having a Mooney viscosity ($ML_{1+4}$ 100° C.) of 30–140 and containing 10–30% by weight of propylene.

4. A composition according to claim 1 wherein the thermally pre-decomposed olefinic plastic (B) is an isotactic polypropylene or a propylene-a-olefin copolymer having a melt index $M_0$ of 1–10 g/10 min before subjected to the thermal decomposition and a melt index $M_1$ of 20–50 g/10 min after subjected to the thermal pre-decomposition.

5. A composition according to claim 1 wherein the bismaleimide compound (D) is N,N'-m-phenylene-bismaleimide.

6. A bumper part comprised of the composition according to claim 1.

7. An automobile exterior trim part comprised of the composition according to claim 1.

8. An electrical part comprised of the composition according to claim 1.

9. A process for producing a thermoplastic elastomer composition which comprises preparing a mixture of (A) 20–50 parts by weight of an olefinic copolymer rubber, (B) 50–80 parts by weight of a thermally pre-decomposed olefinic plastic having a ratio of melt index $M_1/M_0$ of 2–50 wherein $M_1/M_0$ is a thermal decomposition degree of olefinic plastic thermally pre-decomposed, $M_0$ is a melt index of the plastic before being subjected to thermal decomposition with organic peroxide and $M_1$ is a melt index of the plastic after being subjected to the thermal decomposition with the organic peroxide, the sum of (A) and (B) being 100 parts by weight, (C) 5–25 parts by weight of a mineral oil and (D) 0.1–3 parts by weight of a bismaleimide compound, said bismaleimide compound (D) being homogeneously dispersed in said mixture, and then dynamically heat treating said mixture in the presence of (E) an organic peroxide.

10. A process according to claim 9 wherein the olefinic copolymer rubber (A) has a Mooney viscosity ($ML_{1+4}$ 100° C.) of 30–140.

11. A process according to claim 9 wherein the olefinic copolymer rubber (A) is an ethylene-propylene-non-conjugated diene copolymer rubber having a Mooney viscosity ($ML_{1+4}$ 100° C.) of 30–140 and containing 10–30% by weight of propylene.

12. A process according to claim 9 wherein the olefinic plastic (B) is an isotactic polypropylene or propylene-α-olefin copolymer having a melt index $M_0$ of 1–10 g/10 min before subjected to the thermal decomposition and a melt index $M_1$ of 20–50 g/10 min after subjected to the thermal pre-decomposition.

13. A process according to claim 9 wherein the bismaleimide compound (D) is N,N'-m-phenylenebismaleimide.

14. A process according to claim 9 wherein the dispersion is made in the nitrogen atmosphere.

* * * * *